United States Patent [19]

Miyamoto

[11] 4,419,825
[45] Dec. 13, 1983

[54] HEIGHT GAUGE

[75] Inventor: Shigeo Miyamoto, Utsunomiya, Japan

[73] Assignee: Kabushiki Kaisha Mitutoyo Seisakusho, Tokyo, Japan

[21] Appl. No.: 363,808

[22] Filed: Mar. 31, 1982

Related U.S. Application Data

[63] Continuation of Ser. No. 170,061, Jul. 18, 1980, abandoned.

[30] Foreign Application Priority Data

Jul. 23, 1979 [JP] Japan ................................. 54-101648

[51] Int. Cl.$^3$ ................................................. G01B 5/02
[52] U.S. Cl. ................................................... 33/169 R
[58] Field of Search .......................... 33/169, 170–172, 33/147, 158, 159, 143

[56] References Cited

U.S. PATENT DOCUMENTS

| | | | |
|---|---|---|---|
| 2,512,042 | 6/1950 | Stern | 33/143 J |
| 2,695,455 | 11/1954 | Zweekly et al. | 33/170 |
| 3,273,248 | 9/1966 | Halverstadt | 33/147 T |

FOREIGN PATENT DOCUMENTS

| | | | |
|---|---|---|---|
| 844072 | 7/1952 | Fed. Rep. of Germany | 33/143 J |
| 130482 | 1/1951 | Sweden | 33/143 J |
| 9429 | of 1907 | United Kingdom | 33/143 J |
| 936301 | 9/1963 | United Kingdom | 33/143 J |

Primary Examiner—Harry N. Haroian
Attorney, Agent, or Firm—Quaintance & Murphy

[57] ABSTRACT

Height gauge characterized in that a clamp body, which is slidably supported on a main beam, rotatably supports a clamp lever and one end of the clamp lever is directly or indirectly pressed against the main beam by the force of a spring, thereby making it possible to simply and quickly clamp the clamp body which supports a slider.

2 Claims, 6 Drawing Figures

HEIGHT GAUGE

This application is a continuation of U.S. application Ser. No. 170,061, filed July 18, 1980 now abandoned.

BACKGROUND OF THE INVENTION

The present invention relates to a height gauge designed such that a clamp body can be clamped to a main beam by means of a clamp lever which is rotatably supported by the clamp body and whose one end is spring-urged toward the main beam.

A conventional height gauge has been known in which a main beam is fixed upward on the base; a clamp body and a slider are held on the main beam to be movable in the vertical direction; a feed screw is fixed to the slider to be parallel to the main beam and toward the side of said clamp body; a feed wheel rotatably held on the clamp body is screwed to the feed screw; and a stop screw to clamp the clamp body to the main beam is screwed to the clamp body.

A height gauge of this type is so designed that after the clamp body is clamped to the main beam by means of the stop screw, the slider can be finely adjusted upward or downward by rotating the feed wheel.

However, the stop screw and the feed wheel are set on the opposite sides of the clamp body and a clamping is effected by rotation of the stop screw; therefore it is impossible to smoothly coordinate the clamping by the stop screw and the operation of the feed wheel.

Moreover, since the head of the stop screw is tiny, it takes time to turn the stop screw in the direction of clamping the clamp body to the main beam and appropriately adjust the clamping force of the stop screw. Furthermore, since the clamping force differs in each clamping operation, there is a likelihood of the thread of the stop screw or the main beam being damaged, depending on the clamping force applied.

As it is impossible from the appearance of the stop screw to tell whether the clamp body is clamped to the main beam or not, it may happen that direct vertical movement of slider and clamp body fails; in that case it will be necessary to loosen the stop screw and again try to move the slider and the clamp body.

SUMMARY OF THE INVENTION

The primary object of the present invention is to provide a height gauge in which a clamp body to support a slider can be simply and quickly clamped to a main beam by means of a clamp lever, thereby enabling a swift measurement.

Another object of the present invention is to provide a height gauge in which a clamp lever is spring-urged toward a main beam by means of a compressive spring inserted between the clamp lever and the clamp body and thereby the spring means to urge one end of the clamp lever toward the main beam does not obstruct the clamping operation.

Still another object of the present invention is to provide a height gauge in which one end of a clamp lever is directly pressed against a main beam, thereby reliably developing a clamping force.

Still another object of the present invention is to provide a height gauge in which the distance from the operating end of the clamp lever to the compressive spring is set longer than the distance from the compressive spring to the pivotal point of the clamp lever, thereby making it possible to unclamp with a light force.

Still another object of the present invention is to provide a height gauge in which a leaf spring is inserted between a main beam and the end of a clamp lever which is urged toward the main beam, thereby making it possible to develop a heavy clamping force as well as to prevent the main beam from being damaged by the clamping force.

Still another object of the present invention is to provide a height gauge in which a pressing piece to come into press-contact with a main beam is attached to the clamp lever, and thereby the shape and length of the pressing piece can be freely selected.

Still another object of the present invention is to provide a height gauge in which a pressing piece to come into press-contact with a main beam is screwed to a clamp lever and thereby the pressing force can be varied through selection of the length of the pressing piece.

Still another object of the present invention is to provide a height gauge in which an eccentric cam attached to a clamp lever serves as a pressing piece to come into press-contact with the main beam and thereby the original position can be restored by the action of the eccentric cam, even when the clamp body is shifted.

These and other objects, features and advantages of the present invention will become more apparent from reading of the following detailed description with reference to the attached drawings.

DETAILED DESCRIPTION OF THE INVENTION

Figures 1, 2:
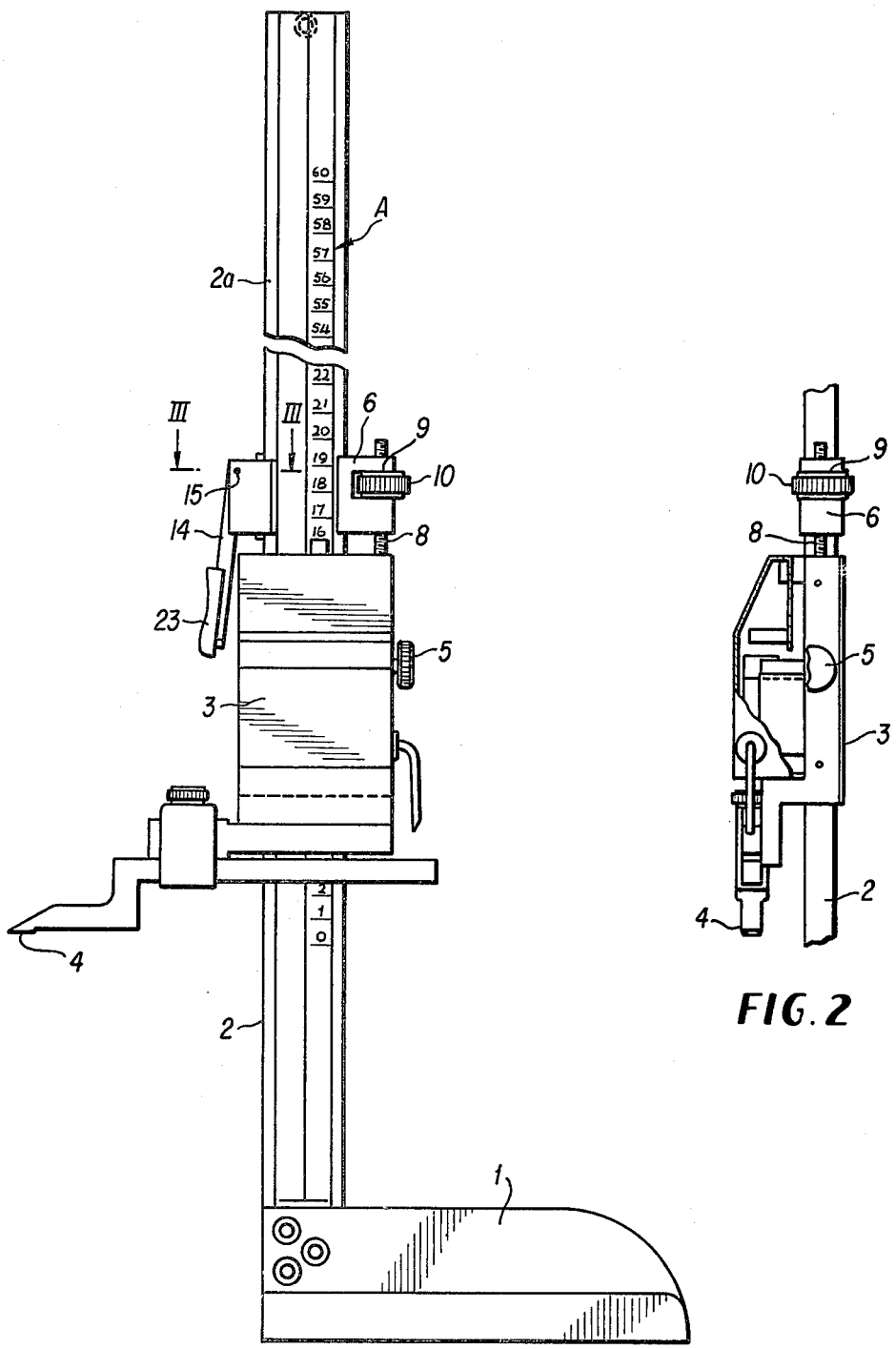
FIG. 1 is a side view of a height gauge as one embodiment of the present invention.
FIG. 2 is a right side view showing the clamp body and the slider of the height gauge illustrated in FIG. 1.

The present invention is to be described referring to the drawings illustrating its embodiments.

One embodiment is illustrated in FIGS. 1 to 4. In FIG. 1, 1 is a base; 2 is a main beam supported upward on the base 1; 3 is a slider supported on the main beam 2 to be movable in the vertical direction; 4 is a scriber attached to the slider 3; and 5 is a clamp screw which is screwed to the slider 3 and adapted to screw the slider 3 to the main beam 2 fixably.

Considering the embodiment in more detail, the base 1 has a bottom planar surface 1a which rests on the horizontal surface from which the vertical distance is being measured. Moreover, the base 1 has a first end 1b and a second end 1c. The vertical main beam 2 is attached to the first end 1b of the base and extends perpendicularly with respect to the bottom planar surface 1c. As is readily seen in FIG. 1, the base 1c does not extend past the first edge 2a of the main beam. The main beam has a second edge 2b which faces in the same direction that the second end 1c of the base 1 extends.

A is a scale provided on the main beam 2.

Figure 3:
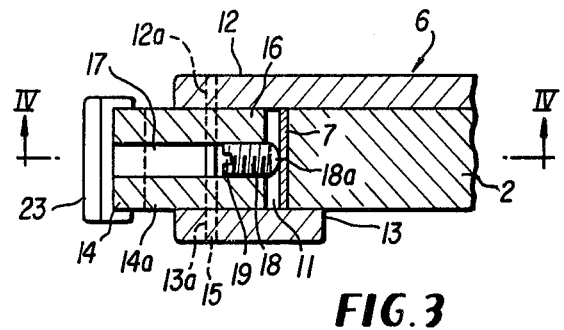
FIG. 3 is a sectional view at III—III of FIG. 1.
Figure 4:
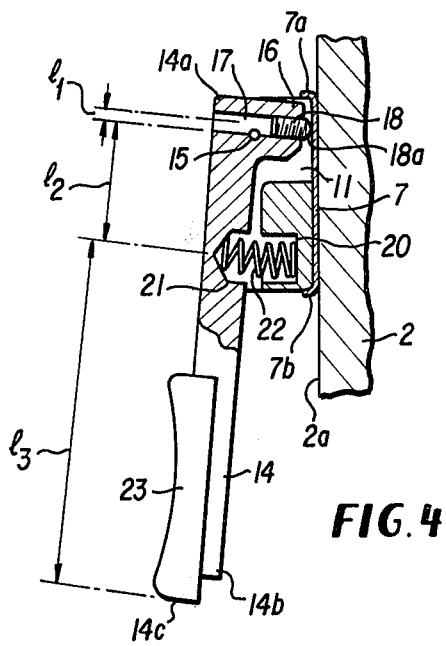
FIG. 4 is a sectional view at IV—IV of FIG. 3.

6 is a clamp body supported movably in the vertical direction on the main beam 2 and above the slider 3. As indicated in FIGS. 3 and 4, a leaf spring 7 is inserted between one side 2a of the main beam 2 and the clamp body 6. Before inserted between the clamp body 6 and the main beam 2, the leaf spring 7 is bent in an arc toward the main beam 2. However, this profile of the leaf spring is not restrictive. As seen from FIG. 4, the upper and lower ends (in the movable direction of the clamp body 6) 7a, 7b of the leaf spring 7 are bent in the direction of the clamp body 6 and come in close contact with the top and bottom sides of the clamp body 6, thereby preventing the leaf spring 7 from being displaced relative to the clamp body 6 in the movable direction of the clamp body 6.

8 is a feed screw fixed to the top side of the slider 3 on the side of the clamp screw 5. The feed screw 8 is set parallel to the slider 3. Meanwhile, the feed screw 8 runs through the clamp body 6 and a slit 9 provided on the clamp body 6. The feed screw 8 is also screwed to the feed wheel 10 which fits the slit 9 rotatably and tightly in the vertical direction.

In FIGS. 3 and 4, 11 is a slit formed on one side of the clamp body, the slit 11 being opposed to the slit 9 and facing the leaf spring 7. 12, 13 are opposite pieces integrally formed on the clamp body 6 across the slit 11.

To these opposite pieces 12, 13 is rotatably pivoted one end of a clamp lever 14 going into the slit 11 through a spring pin 15 serving as a supporting point to cross the main beam 2 at right angles. 12a, 13a are holes to hold the spring pin 15. On one end 14a of the clamp lever 14 is integrally formed a projection 16 extending on the side of the leaf spring 7. 17 is a screw hole running through one end 14a of the clamp lever and the projection 16 and the hole 17 is approximately normal to the clamp lever 14. The screw hole 17 engages with a screw 18 which is a pressing piece serving as working point. The screw 18 extends from the projection 16 toward the leaf spring 7 at such a position that its spherical tip 18a can bear against the leaf spring 7. 19 is a driver-hold groove provided inside at the end of the screw hole 17.

In the embodiment illustrated, the pressing piece to directly or indirectly press against the main beam is a screw 18, but it may consist of a pin or the like. When a pin is used, the pin will be fitted by adhesive or forced into the screw hole 17 or bonded therein.

In the portion of the clamp body 6 lower than the spring pin 15, there is formed a holding hole 20 facing the clamp lever 14. A holding hole 21 opposed to the hole 20 is formed in the clamp lever 14, and between these holes 20 and 21 is inserted a compressive spring 22. The compressive spring 22 urges one end 14a of the clamp lever 14 to one side 2a of the main beam 2, thereby pressing the tip of the screw 18 at the end 14a against the leaf spring 7. A frictional force thus developed between the leaf spring 7 and the main beam 2 fixes the clamp body 6 to the main beam 2, 23 being a finger grip provided at the other end 14b of the clamp lever 14.

As is seen in FIG. 1, the feed screw 8 and knob 10 are juxtaposed with the second edge 2b of the main beam 2, while the clamp lever 14 is pivoted in juxtaposition with the first edge 2a of the main beam 2. Accordingly, the entire assembly consisting of the clamp body 6 and slider 3 can be moved and adjusted with one hand. For example, the feed wheel 10 can be operated with one's thumb, while the finger grip 23 is pressed with the middle finger.

Figure 5:
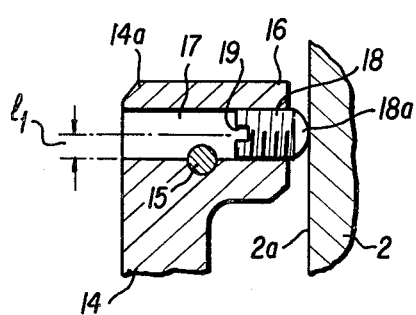
FIGS. 5 and 6 are partial sectional views of height gauges as other embodiments of the invention.

As is seen in FIGS. 3, 4 and 5, the spring pin 15 intersects the bore 17 along a chord thereof so as to block movement of the set screw 18 out of the bore. However, the set screw 18 can still be adjusted by inserting a screwdriver into the bore.

Putting the distance from the center of the screw 18 to the center of the spring pin 15 as $l_1$, the distance from the spring pin 15 to the center of the compressive spring 22 as $l_2$, and the distance from the center of the compressive spring 22 to the other end 14c of the clamp lever 14, i.e., its working point as $l_3$, the values of these $l_1$, $l_2$ and $l_3$ are set according to the following formulas (1), (2) [(2) is a specific example of (1)] so that the unclamping force can be made small, while the clamping force can be made large:

$$l_1 < l_2 < l_3 \qquad (1)$$

$$l_1 : l_2 = 1 : 10 \qquad (2)$$

The example is merely illustrative and it is nothing restrictive. As understood from the drawings and from the above formulae, $l_1$ is the least, followed by $l_2$; and $l_3$ is the greatest.

Next, the handling of a height gauge of the above constitution is to be described.

Normally the clamp screw 5 is held loose. When the finger grip 23 of the clamp lever 14 and the clamp body 6 are simultaneously grasped and the finger grip 23 is displaced against the compressive spring 22 toward the main beam 2, the screw 18 at one end 14a of the clamp lever 14 leaves the leaf spring 7. Then, the frictional force developed between the leaf spring 7 and one side 2a of the main beam 2 will come only from the force of the leaf spring 7 and thereby the clamp body 6 will be vertically moved relative to the main beam 2. Thus the slider 3 is vertically movable along the main beam by vertically moving the clamp body 6 by means of the finger grip 23 of the clamp lever 14.

When the clamp lever 14 is released, the force of the compressive spring causes the pin 18 to bear against the leaf spring 7, which is then pushed to one side 2a of the main beam 2; and a frictional force developed thereby between the leaf spring 7 and one side 2a of the main beam fixes the clamp body 6 to the main beam 2.

This frictional force can be adjusted by controlling the force of the compressive spring 22 through regulation of the amount of extension of the screw 18, which is a pressing piece, toward the leaf spring 7. This adjustment is done by rotation of the screw 18 by means of a screw driver inserted into the screw hole 17.

Such operations of the clamp lever 14 and the clamp body 6 cause the tip of the scriber 4 to come closer to an object to be measured; then the rotation of the feed wheel 10 causes the slider 3 to shift slightly upward or downward, thereby bringing the tip of the scriber 4 exactly up to the part of the object to be measured.

In the examples illustrated above, the screw 18 is pressed against the leaf spring 7 so that a frictional force to clamp the clamp body 6 to the main beam 2 can be developed between the leaf spring 7 and one side 2a of the main beam 2, but the leaf spring 7 is not always necessary; as indicated in FIG. 5, the screw 18 may be set in direct contact with one side 2a of the main beam 2.

Figure 6:
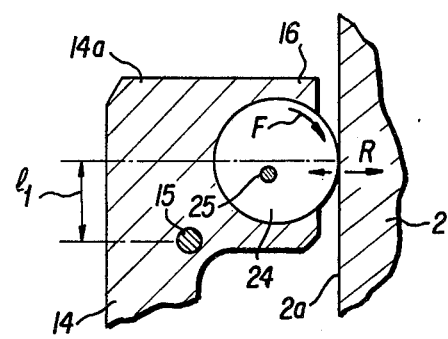

The screw 18 as a pressing piece is not the only means to bear against one side 2a of the main beam 2; as indicated in FIG. 6, an eccentric cam 24 to serve as a pressing piece may be fitted to one end of the clamp lever 14 to be rotatable around a shaft 25 orthogonal to the main beam 2 and said cam 24 may be set in direct contact with one side 2a of the main beam 2. In this case, when the scriber 4 in FIG. 1 is pressed to the measured object from above, an upward drag acts on the clamp body 6, causing a clockwise turning force F to act on the eccentric cam 24. Thus the eccentric cam 24 tends to turn clockwise in FIG. 6. When the eccentric cam 24 turns clockwise under this action, one end 14a of the clamp lever 14 displaces in the direction of leaving one side 2a of the main beam 2, thereby further compressing the compressive spring 22; and in consequence the clamping force R working between the eccentric cam 24 and one side 2a of the main beam 2 increases.

As described above, the present invention is constituted such that the clamp body can be clamped to or unclamped from the main beam by means of a clamp lever which is rotatably supported on the clamp body and whose one end is spring-urged toward the main beam, so that, even if the feed wheel and the clamp lever are attached to opposite sides of the clamp body, the clamp body can be easily clamped to or unclamped from the main beam by an easy, swift operation of the clamp lever and in consequence a coordinated action of the feed wheel and the clamp lever can be easily and swiftly effected.

Moreover, since the force of the clamp lever to clamp the clamp body to the main beam comes from a spring which urges one end of the clamp lever to the main beam, the clamping force can be constant, no matter how many times the clamp lever is operated, thereby preventing the clamp pin or the main beam from being damaged by clamping.

Furthermore, in the state of the clamp lever being released, the clamp body remains clamped to the main beam and accordingly any wasteful operation to check whether or not the clamp body is clamped to the main beam, as conventionally done, will be needless.

Furthermore, since the clamp lever is spring-urged toward the main beam by means of a compressive spring inserted between the clamp lever and the clamp body, the spring means to urge one end of the clamp lever toward the main beam is not likely to obstruct the clamping operation.

Furthermore, since the distance from the operating end of the clamp lever to the compressive spring is set longer than the distance from the compressive spring to the pivotal point of the clamp lever, unclamping can be effected by a light force.

Furthermore, since one end of the clamp lever is directly pressed against the main beam, the clamping force can be reliably developed.

Furthermore, since a leaf spring is inserted between the urged end of the clamp lever and the main beam, it is possible to develop a heavy clamping force as well as to prevent the main beam from being damaged by clamping.

Furthermore, since a pressing piece to press against the main beam is provided in the clamp lever, the shape and length of said pressing piece can be freely selected.

Furthermore, since said pressing piece is screwed to the clamp lever, it is possible to freely adjust the pressing force by changing the length of the pressing piece.

Furthermore, since an eccentric cam attached to the clamp lever serves as the pressing piece against the main beam, it is possible to prevent the clamp body from being shifted even if a force acts to displace it slightly, because after removal of the force the clamp body can restore its original position by the action of the eccentric cam. Thus with no displacement of the clamp body or the slider after measurement, any measuring error due to displacement of the clamp body can be reliably avoided and an accurate measurement is assured.

What is claimed is:
1. A height gauge comprising:
   A. a vertical main beam having an end face; and
   B. a slider having an upper edge portion, slidably mounted on the main beam, said slider carrying a scriber and a feed screw; and
   C. a clamp body slidably mounted on the main beam and attached to the slider by means of the feed screw; said clamp body comprising:
      (1) a clamp lever pivotally mounted on the clamp body; said clamp lever having a beam-contacting end and a finger-contacting end, wherein the beam-contacting end has a rotatable eccentric cam which engages the adjacent face of the main beam and by being rotated adjusts the force between the clamp lever and main beam; and
      (2) said clamp lever having a finger grip, wherein said finger grip is extended up to the upper side portion of said slider; and
      (3) said clamp lever pivoting about an axis parallel to the end face of the main beam, about a spring pin, wherein the axis is in close proximity to the eccentric cam; and
      (4) the beam-contacting end of said clamp lever being urged toward the beam by a spring held under compression between the clamp lever and clamp body;
   wherein the distance from the center of said compression spring to the finger-contacting end of said clamp lever is greater than the distance from the contact point of said eccentric cam and said spring pin pivot point.

2. A height gauge for measuring vertical distance from a horizontal surface, the gauge comprising:
   A. a base having a planar surface for resting on the horizontal surface, the base having first and second ends;
   B. a main beam having first and second longitudinal edges, the main beam being attached to the base and extending perpendicularly with respect to the horizontal surface of the base at a position coextensive with the first end of the base; whereby when the planar surface of the base is resting on the horizontal surface, the main beam extends vertically with respect to the surface and there exists an uninterrupted space between the first edge of the main beam and the horizontal surface;
   C. a slider having an upper side portion, slidably mounted on the main beam said slider carrying a scriber extending from the first edge of the main beam and a feed screw juxtaposed with the second edge of the main beam and extending parallel thereto;
   D. a clamp body slidably mounted on the main beam outboard of the slider and attached to the slider by a feed wheel mounted in the clamp body, which feed wheel receives the feed screw, the clamp body comprising:
      (1) a leaf spring interposed between the clamp body and the first edge of the main beam, the leaf spring constituting a thin piece of metal, one parallel side of which lies along the first face of the main beam and the ends of which are bent over projecting portions of the clamp body to retain the leaf spring on the clamp body;

(2) a clamp lever mounted on the clamp body adjacent to the first edge of the main beam; said clamp lever having a beam-pressing end and a finger-contacting end, wherein the beam-pressing end has a tapped hole containing a contacting screw adjusted to contact the leaf spring interposed between the contacting screw and the first edge of the main beam;

(3) a pivot pin for pivotally mounting the clamping lever on the clamp body, the pivot pin passing through the tapped hole of the clamp lever in alignment with a chord of the bore which chord is outboard of the screw and below the diameter of the tapped hole, and the pivot pin being seated in the clamp body, whereby the clamp lever pivots with respect to the clamp body and the screw is adjustably retained within the bore;

(4) said clamp lever having a finger grip over the finger-contacting end, wherein said finger grip is extended over the upper side portion of the slider;

(5) a spring disposed in compression between the clamp lever and the clamp body for urging the beam-pressing end of the clamp lever toward the first edge of the main beam, wherein the distance from the pivot pin to the compression spring is approximately ten times the distance from the contacting screw to the pivot pin, and wherein the distance from the center of the compression spring to the end of the finger-contacting end of the clamp lever is greater than the distance from the center of the contacting screw to the pivot point.

* * * * *